United States Patent [19]

Miyamoto

[11] 4,084,888
[45] Apr. 18, 1978

[54] PROTECTIVE COVER FOR SPECTACLE JOINT

[76] Inventor: Yoji Miyamoto, 12-24 Nishi-Yamamoto-Cho, 4-Chome, Yao-shi, Osaka, Japan

[21] Appl. No.: 719,746

[22] Filed: Sep. 2, 1976

[51] Int. Cl.² .................................................. G02C 1/08
[52] U.S. Cl. ........................................ 351/97; 351/152
[58] Field of Search ................... 351/90, 97, 100, 111, 351/140, 152

[56] References Cited

U.S. PATENT DOCUMENTS 2,154,382  4/1939  Lindblom ................................ 351/97
2,974,567  3/1961  Di Lorenzo ....................... 351/140 X

FOREIGN PATENT DOCUMENTS 1,038,975  10/1953  France ..................................... 351/97

Primary Examiner—Paul A. Sacher
Attorney, Agent, or Firm—Griffin, Branigan and Butler

[57] ABSTRACT

A cover having a U-shaped cross section is slidably affixed over opposed lugs of a spectacle frame wherein the lugs thereof are held together by a fastener having the tail end thereof extending through one of the lugs. One of the legs of the U-section covers the head of the fastener located at the other lug and, the other cover leg has a hole therethrough and a cut-away portion extending between the hole and the edge of the leg so that the cover can be slid over the tail end of the fastener to locate it in the hole.

8 Claims, 4 Drawing Figures

PROTECTIVE COVER FOR SPECTACLE JOINT

BACKGROUND OF THE INVENTION

This invention relates to a cover for spectacle-frame lugs. More particularly, it relates to such a cover for the type of spectacle frame such as "wire rims" wherein the lenses are fixed within the rim by means of lugs that are attached to or part of the rim and selectively held together by means of a fastener.

Since the spectacle lenses are held in place by the above-described clamping action of the lugs, it is important to provide a means for ensuring that the lugs do not become inadvertently separated. When the lugs are screwed together, for example, it is customary to provide an additional set screw or the like to provide insurance against the lug-closing screw coming loose so as to result in the lenses falling from their rims. In this respect, it is an object of this invention to provide a supplemental clamping means on said lugs in order to prevent their becoming inadvertently separated.

Another means for supplementally fastening screws in such lugs is to "stake" them or punch them axially so that the screw threads become tight within the lugs. In such cases, however, the lugs often become misaligned so as to have sharp and unattractive exposed edges. It is, therefore, another object of this invention to provide a cover for such edges so that the spectacles have a more pleasing appearance and the edges are not as likely to become caught on things.

The lug portions of the above-described spectacles have a tendency to become dirty from sweat, water, skin oils, and gaseous pollutants in the air. Hence, particularly where such lugs are fastened together by screws, it is often difficult to separate the lugs for removal and replacement of the lenses. Consequently, it is another object of this invention to provide a lug cover to prevent the lugs and lug screws from becoming dirty while, at the same time, preventing them from coming apart.

One of the advantages of the invention is that the supplemental lug cover can be easily placed over the lugs without the use of special or additional tools.

Often, "wire-rim" type spectacles have curved elements for joining the frames at the lug joints to a temple piece. This, therefore, creates a composite joint having an unpleasant appearance; whereupon, it is another object of the invention to provide a cover that mates with the curved piece and the rim so that the composite joint is substantially enclosed and thereby presents a more pleasing appearance.

SUMMARY

Split-rim spectacles have lugs affixed thereto adjacent the split so that a lens is fastened within the rim by drawing the lugs together by a fastener having a tail end thereof extending out of one of the lugs.

A cover, having a generally U-shaped cross section, has a hole in one of the legs thereof and a cut-away portion between the forward edge of the leg and the hole so that the leg can be slid over the protruding tail end of the fastener while the cover's other leg slides over the other lug and covers the head end of the fastener.

BRIEF DESCRIPTION OF THE DRAWINGS

The foregoing and other objects, features, and advantages of this invention will be apparent from the more particular description of preferred embodiments thereof as illustrated in the accompanying drawings wherein the same reference numerals refer to the same elements throughout the various views. The drawings are not necessarily intended to be to scale, but rather are presented so as to illustrate principles of the invention in clear form.

In the drawings.

DETAILED DESCRIPTION

Figure 1:
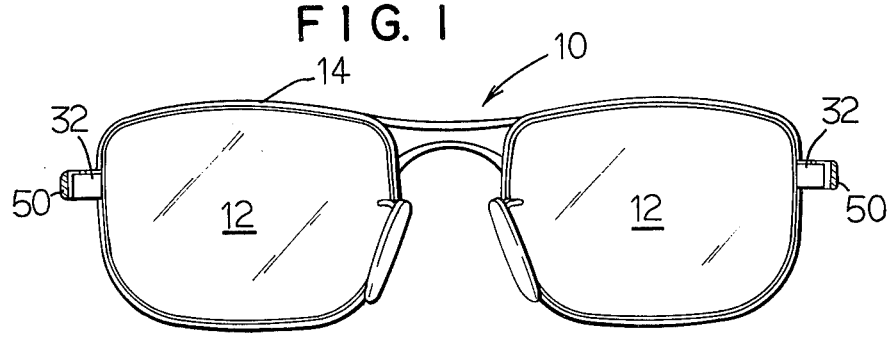
FIG. 1 is a partially cut-away rear view of spectacles having covers of the invention.

With reference to FIG. 1, a pair of spectacles 10 has lenses 12 mounted in wire rims 14. In this respect, the rims are split as at 16 (FIG. 2) to form an upper portion 18 and a lower portion 20. The end of the upper portion 18 has a lug 22 soldered or otherwise attached thereto; and, the end of the lower portion 20 has a lug 24 similarly attached thereto.

Lenses are seated within the frames by using a fastener such as screw 26 having a head end 28 and a tail end 30 thereof—the tail end 30 extending past the upper surface of lug 22 as shown. Lug joints such as those formed by lugs 22 and 24 and the screw 26, however, do not present a pleasing appearance; and, moreover, the fasteners often have a tendency to accidentally work loose so as to result in the lenses falling out. In this respect, as will now be described, a cover member 32 both covers the joint and holds the fastener in place.

Figure 4:
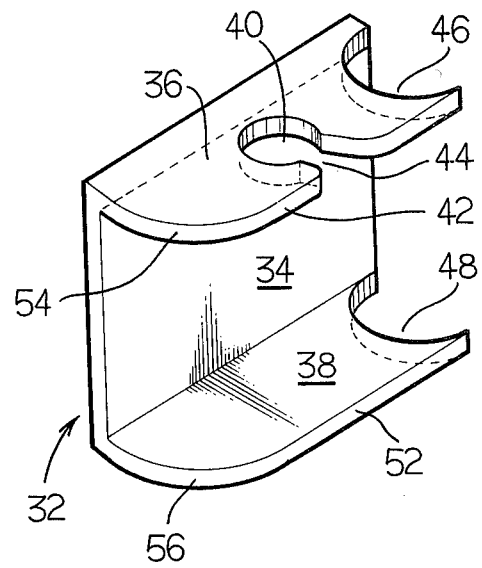
FIG. 4 is an enlarged perspective view of a cover of the invention.

As shown in FIG. 4, the cover is comprised of a back piece 34 and upper and lower leg elements 36 and 38 so as to have a U-shaped cross section. The upper leg 36 has a hole 40 therein which is connected to the forward edge 42 of the upper leg by a cut-away portion 44. Additionally, both of the legs 36 and 38 have recessed portions 46 and 48, respectively, for location abutting the upper and lower rim portions 18 and 20 as will be described shortly.

A curved member 50 is affixed to the lug-joint area of the spectacles such as to the upper rim portion 18 or the outer surface of the upper lug 22. The other end of the curved member 50 is joined by a hinge, not shown, to a temple piece, also not shown.

Figure 2:
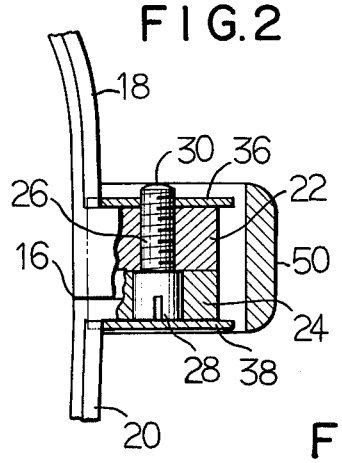
FIG. 2 is an enlarged sectional view of a lug joint covered by a cover of the invention.
Figure 3:
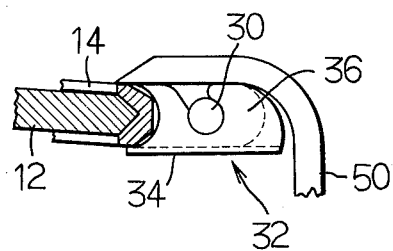
FIG. 3 is a top view of the structure illustrated in FIG. 2.

In operation, after the lugs 22 and 24 are fastened by the screw 26 as shown in FIG. 2, the protective cover 32 is slid forwardly over the joint as shown in FIG. 3 so that the lower leg 38 covers the screw head 28 and prevents the screw from falling out; the back 34 covers the back of the lugs and the lug joint so as to keep them hidden from view as shown in FIG. 1; and, the protruding tail end 30 of the fastener slides through the cover's cut-away portion 44 for retension in the hole 40. In this respect, it is preferred that the hole 40 be snugly fit to the tail end 30 of the fastener.

Additionally, as shown in FIGS. 3 and 4, the cut-away portions 46 and 48 fit snugly against the rim portions 18 and 20 to prevent dirt and the like from entering the lug joint area and provide a pleasing appearance. Similarly, the front surfaces 42 and 52 of the legs 36 and 38 are shaped to mate with the corresponding portions of the curved member 50 as are the outermost edges 54 and 56 of the legs 36 and 38. In this manner, the protective cover fits over substantially the entire composite area of the lug joint and the adjacent portions surrounded by the curved member 50. Additionally, it will be appreciated that the cover 34 can easily be detached by simply sliding it off of the lug joint without the requirement of any special tools.

While the invention has been particularly shown and described with reference to preferred embodiments thereof, it will be understood by those skilled in the art that various changes in form and detail may be made therein without departing from the spirit and scope of the invention. For example, the cover 34 can be made of any suitable material and can either match or contrast with the frames and/or temple pieces. Hence, the subject matter for which an exclusive privilege is claimed is only defined by the following claims:

I claim:

1. A protective cover for a spectacle frame of the type having a split rim and first and second opposed connection lugs on respective ends of said split rim and a fastening means having a head end and a tail end for extending into and through said first and second lugs to hold said lugs together at a lug joint between said lugs to thereby hold said rim together around a lens, said fastener having the tail end thereof extending out of one of said lugs, said cover comprising:

a member having a generally U-shaped cross section so as to have a back section and first and second legs thereof, said U-shaped member being sized to fit over said lugs so that one of said legs covers a side of one lug and the other of said legs covers a side of the other lug while the back section extends across both of said lugs and said lug joint;

means defining a hole in said first leg for location around the tail end of said fastener; and an opening between an edge of said first leg and said means defining said hole so that said first leg is slidable over said tail end of said fastener while the other of said legs covers the head end of said fastener.

2. The cover of claim 1 wherein said means defining said hole in said first lug snugly engages the tail end of said fastener.

3. The cover of claim 1 wherein the ends of said legs to be mounted adjacent said rims are recessed to accommodate said rims and fit therearound.

4. The cover of claim 3 wherein said means defining said hole in said first lug snugly engages the tail end of said fastener.

5. The cover of claim 1 wherein said spectacle frame is of the type including a curved member extending between a temple piece and the front of said frame adjacent the lug joint and wherein said cover includes:

curved portions on the outer ends of the legs thereof for mating with said curved members so that said cover substantially covers the otherwise exposed area between said rims and said curved member.

6. The cover of claim 5 wherein said means defining said hole in said first lug snugly engages the tail end of said fastener.

7. The cover of claim 5 wherein the ends of said legs to be mounted adjacent said rims are recessed to accommodate said rims and fit therearound.

8. The cover of claim 7 wherein said means defining said hole in said first lug snugly engages the tail end of said fastener.

* * * * *